H. W. KAKASKA.
SHOCK ABSORBER.
APPLICATION FILED APR. 18, 1919.
1,319,873.   Patented Oct. 28, 1919.
Fig. 1.
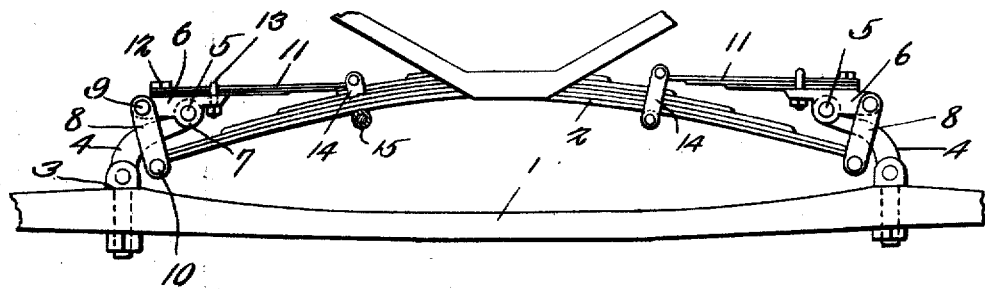
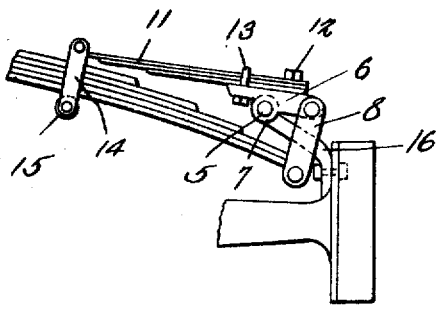
Fig. 2.
H. W. Kakaska
Inventor

UNITED STATES PATENT OFFICE.

HENRY W. KAKASKA, OF BISMARCK, NORTH DAKOTA.

SHOCK-ABSORBER.

1,319,873.   Specification of Letters Patent.   Patented Oct. 28, 1919.

Application filed April 18, 1919. Serial No. 290,987.

*To all whom it may concern:*

Be it known that I, HENRY W. KAKASKA, a citizen of the United States, residing at Bismarck, in the county of Burleigh and State of North Dakota, have invented a new and useful Shock-Absorber, of which the following is a specification.

This invention relates to shock absorbers for automobiles and has for its object to provide a simple, efficient device that may be readily attached to a vehicle without alteration in the present structure. Another object is the provision of a shock absorber that is designed to support a vehicle spring at a point intermediate its length which not only lessens road shocks in a marked degree but practically eliminates spring breakage.

With these and other objects in view as will appear as the description proceeds, and as particularly pointed out in the appended claims it is within the province of the disclosure to improve generally and to enhance the utility of devices of that type to which the present invention appertains:

In the drawing:—

Figure 1 is a view in front elevation with parts broken away and parts in section of the device as applied to a front axle of a well-known make of car.

Fig. 2 is a view in elevation of a device constructed in accordance with the present invention applied to a rear axle.

Referring particularly to the drawing in which like reference characters are applied to like parts throughout the drawings the numeral 1 designates the front axle of an automobile and 2 the front spring.

Secured to the axle at 3 is a bracket 4, having fulcrumed at its free end as shown at 5 a block 6, the block 6 is provided with ears 7 which straddle the end of the bracket 4 and provide for the pivotal connection 5. Links 8 straddle the bracket 4, one end being connected at 9 to the block 6 outside of the pivot 5 and the other end connected through the pin 10 to the end of the spring 2. A laminated spring 11 is secured to the block 6 by a bolt 12 and a clip 13.

The spring 11 is located directly over the front spring 2 and extends in the direction of the length of the spring to a point intermediate the center of the spring and the point of connection 10 to the links 8. A shackle 14 is connected to the spring 11 at its inner end and a roller 15 connected to the shackle underrides the spring 2 at this point.

The construction of the device for the rear spring is identical with that of the one just described except a bracket 16 is substituted for the bracket 4, the bracket 16 being shaped for attachment to the brake drum flange on the rear axle of the automobile.

In use the spring 11 and block 6 become a lever of the first class with its fulcrum on the bracket at 5; the weight of the load applied through the spring 2 and links 8 to the point 9 tend to put the spring 11 under tension and support the spring 2 at a point intermediate its ends by means of the shackle 14 and roller 15.

In this way any additional weight on the spring 2 is transmitted through the arrangement of levers to exert more support to the under side of the spring 2 and by reason of the resilient nature of the support and the location thereof the riding qualities of the car are improved and the life of the springs are considerably lengthened.

The preferred embodiment of the invention has been shown and described but it is to be understood that changes may be made within the scope of the appended claims without departing from the spirit or sacrifice any of the advantages of the invention.

Having thus described the invention what is claimed is:—

1. In a device of the class described, a resilient lever fulcrumed at a point intermediate its ends to a fixed portion of a vehicle and adjacent the vehicle spring, one arm of the lever being connected to the vehicle spring and the other arm supporting the spring intermediate its ends.

2. In a device of the class described, a resilient lever fulcrumed intermediate its ends, means for supporting the lever from a vehicle axle adjacent the vehicle spring, means for connecting one end of the lever to said spring, and means for supporting the spring intermediate its ends from the other end of said lever.

3. In a device of the class described, a bracket adapted for attachment to a vehicle axle, a resilient lever fulcruming intermediate its ends on the bracket, a link connecting one end of the lever and one end of the vehicle spring and means for supporting the spring intermediate its ends from the other end of the lever.

In testimony that I claim the foregoing as my own, I have hereto affixed my signature in the presence of two witnesses.

HENRY W. KAKASKA.

Witnesses:
J. A. GRAHAM,
C. R. JONES.